No. 834,905. PATENTED NOV. 6, 1906.
F. H. HASKELL.
FISHING NET.
APPLICATION FILED AUG. 6, 1906.
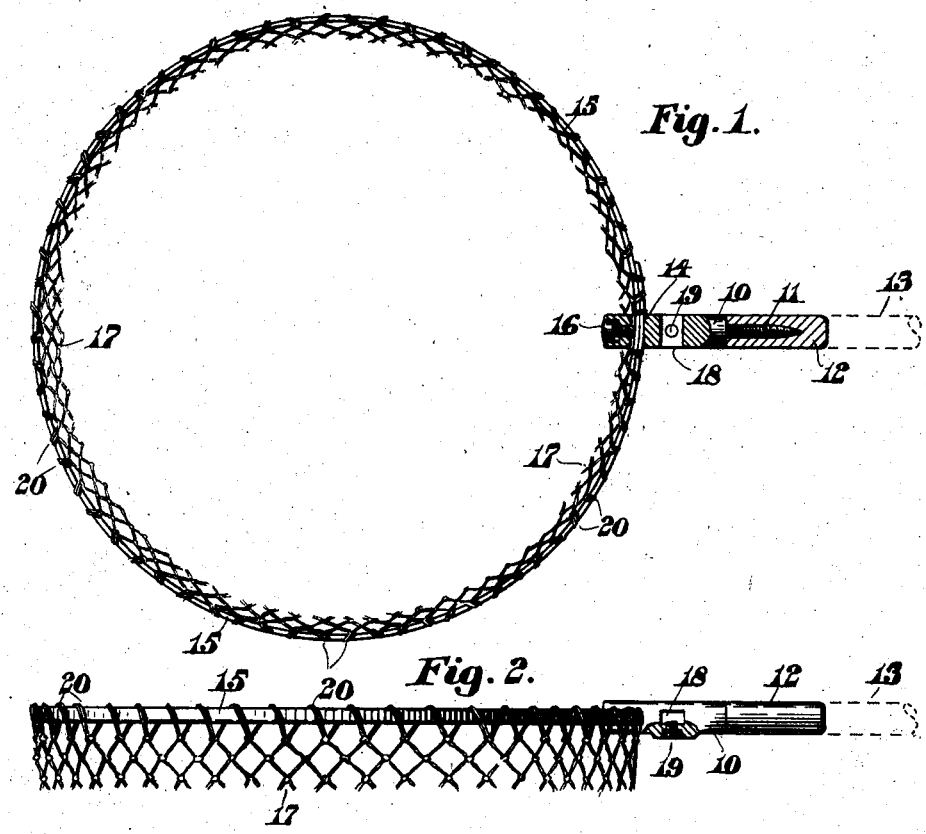
Witnesses:
Nathan C. Lombard
Anthony P. Mathering
Inventor:
Frank H. Haskell,
by Walter E. Lombard
Atty.

UNITED STATES PATENT OFFICE.

FRANK H. HASKELL, OF BOSTON, MASSACHUSETTS, ASSIGNOR OF ONE-HALF TO THOMAS J. SMITH, OF BOSTON, MASSACHUSETTS.

FISHING-NET.

No. 834,905.     Specification of Letters Patent.     Patented Nov. 6, 1906.

Application filed August 6, 1906. Serial No. 329,308.

*To all whom it may concern:*

Be it known that I, FRANK H. HASKELL, a citizen of the United States of America, and a resident of Boston, in the county of Suffolk and State of Massachusetts, have invented certain new and useful Improvements in Fishing-Nets, of which the following is a specification.

This invention relates to fishing-nets, and has for its object the production of a net which is adapted to collapse and to be clamped when in collapsed condition, thereby retaining it in a form in which it may be readily carried in the pocket of a fisherman.

The invention consists of certain novel features of construction and arrangement of parts, which will be readily understood by reference to the description of the drawings and to the claims to be hereinafter given.

Of the drawings, Figure 1 represents a sectional plan of a net embodying the features of the invention, only a portion of the net being shown upon its supporting-rim. Fig. 2 represents an elevation of the same, a portion of the handle-tip being broken in section to show one of the clamping members; and Fig. 3 represents a plan view, partially in section, of the same in collapsed condition ready for insertion in the pocket of the user.

Similar characters designate like parts throughout the several figures of the drawings.

In the drawings, 10 represents a suitable handle-tip provided with a member, such as a screw 11, adapted for securing said tip to any desirable handle. Mounted upon the screw 11 is a cover 12, adapted to prevent the screw 11 from becoming entangled in the pocket or other receptacle in which the net is carried.

When it is desired to use the net, the cover 12 is removed and the screw 11 is inserted into an ordinary handle, such as is partially shown in dotted lines at 13, or a branch may be cut in the vicinity of the place it is desired to fish and the screw inserted in the end thereof.

The tip 10 is provided with a transverse opening 14, in which are mounted the ends of a collapsible disconnected annular rim 15, both ends of which pass through the opening 14 and are clamped together therein by means of the set-screw 16. This set-screw 16 retains the rim 15 in extended position with the mouth of the net 17 expanded in proper condition for immediate operation. The handle-tip 10 is provided with a second transverse opening 18 of greater width than the opening 14, so that a plurality of thicknesses of said rim 15 may pass therethrough and may be clamped therein by means of the set-screw 19. When it is desired to collapse the net, the clamping-screw 16 is turned to release its pressure upon one end of the rim 15, and this end is removed from the opening 14, and the set-screw 16 is then clamped against the remaining end, as shown in Fig. 3, to secure it rigidly in position. A few of the loops 20 are then removed from the rim 15, and the net 17 is then collected at one point upon the rim 15, as shown at 21 in Fig. 3. The unclamped end of the rim 15 is then passed through the opening 18 and makes as small a spiral of the rim 15 as possible without injury thereto, and the set-screw 19 is then operated to clamp the rim in this collapsed position to retain it in suitable form for conveyance in a fisherman's pocket.

The cover 12 is placed upon the screw 11, and the whole device is then in such a form as to occupy but very small space and be readily conveyed to any point where it may be desired for use, when the cover 12 will be removed, the screw 11 inserted in any suitable handle, and the set-screw 19 released from contact with the rim 15, so that it may be fully expanded to permit of the insertion thereon of the few loops 20 removed therefrom. The end of the rim 15 is then inserted in the opening 14, and both ends of said rim are then clamped firmly in position by means of the set-screw 16, to retain the rim in expanded position. The device is then ready for use.

It is believed that the advantages and the operation of the invention will be fully understood from the foregoing description.

I claim—

1. In a fishing-net, the combination of a net-supporting rim; a clamping member having an opening for securing together the ends thereof, provided with a second opening adapted to receive several thicknesses of said rim; and a clamping member to secure said rim therein.

2. In a fishing-net, the combination of a net-supporting rim; a clamping member having an opening for securing together the ends thereof, provided with a second opening adapted to receive several thicknesses of said rim; a clamping member to secure said rim therein; and means for securing said member to a suitable handle.

3. In a fishing-net, the combination of a net-supporting rim; a clamping member having an opening for securing together the ends thereof, provided with a second opening adapted to receive several thicknesses of said rim; a clamping member to secure said rim therein; and a screw projecting from said member and adapted to secure it to a suitable handle.

4. In a fishing-net, the combination of a net-supporting rim; a clamping member having an opening for securing together the ends thereof, provided with a second opening adapted to receive several thicknesses of said rim; a clamping member to secure said rim therein; a screw projecting from said member and adapted to secure it to a suitable handle; and a removable cover for said screw.

5. In a fishing-net, the combination of a net-supporting rim; a handle-tip provided with means for securing it to a suitable handle, and having two transverse openings therein; and a clamping member for each of said openings.

6. In a fishing-net, the combination of a net-supporting rim; a handle-tip provided with means for securing it to a suitable handle, and having two transverse openings therein of different widths; and a clamping member for each of said openings.

7. In a fishing-net, the combination of a handle-tip provided with two openings therein; a net-supporting rim, the ends of which are adapted to pass through said openings; a clamping member for clamping both ends of said rim in one opening when said net is ready for use; and another clamping member adapted to clamp several thicknesses of said rim in the other opening when said net is out of commission.

Signed by me at Boston, Massachusetts, this 30th day of July, 1906.

FRANK H. HASKELL.

Witnesses:
　WALTER E. LOMBARD,
　EDNA C. CLEVELAND.